United States Patent [19]

Penkethman

[11] Patent Number: 5,450,203
[45] Date of Patent: Sep. 12, 1995

[54] METHOD AND APPARATUS FOR DETERMINING AN OBJECTS POSITION, TOPOGRAPHY AND FOR IMAGING

[75] Inventor: John A. Penkethman, Gilroy, Calif.

[73] Assignee: Electroglas, Inc., Santa Clara, Calif.

[21] Appl. No.: 172,426

[22] Filed: Dec. 22, 1993

[51] Int. Cl.$^6$ .............................................. G01B 11/14
[52] U.S. Cl. ...................................... 356/373; 356/375
[58] Field of Search .................. 356/375, 373, 73.1, 356/376; 250/227.2, 227.26, 227.21, 227.29

[56] References Cited

U.S. PATENT DOCUMENTS

| | | | |
|---|---|---|---|
| 4,325,638 | 4/1982 | Takeda et al. | 356/375 |
| 4,581,529 | 4/1986 | Gordon | 250/227.26 |
| 4,692,023 | 9/1987 | Ohtomo et al. | 356/375 |
| 4,806,016 | 2/1989 | Corpron et al. | 356/373 |
| 4,812,003 | 3/1989 | Dambach et al. | 250/227.29 |
| 4,991,971 | 2/1991 | Geary et al. | 250/227.29 |
| 5,120,953 | 6/1992 | Harris | 250/227.26 |
| 5,319,442 | 6/1994 | Rosser | 356/375 |

FOREIGN PATENT DOCUMENTS 9001202  12/1991  Netherlands ............... 250/227.26

OTHER PUBLICATIONS

Daoning Su, Denis R. Hall and Julian D. C. Jones, "Workpeice Position Sensing By Means Of A Fiber Optical Beam Delivery System", Optical Engineering, Aug. 1993, vol. 32 No. 8, pp. 1923-1826.

Article, "Cataract Fiber Optic Probe," Applied Optics, 32, 21, pp. 3823-3824. Jul. 20, 1993.

Primary Examiner—Richard A. Rosenberger
Assistant Examiner—Jason D. Eisenberg
Attorney, Agent, or Firm—Blakely, Sokoloff, Taylor & Zafman

[57] ABSTRACT

Light is supplied via a optical fiber to a probe head. The light exiting the optical fiber is focused to a point by a lens. Reflected light from an object at or near the focal point is reflected back through the lens and then focused to the source optical fiber or a second optical fiber located next the source optical fiber. The return signal is then detected in a detector module. By noting the characteristics of the response curve as the object is moved back and forth relative to the probe head, the position of the object can be determined. By performing this procedure over several points, a detailed topography map can be created. Additionally, the probe head can be scanned at a constant distance from the surface to produce an image of the surface as the response signal varies according to the surface's reflectivity. The microprobe can be used, for example, to find the position of probe tips on a wafer prober, to determine the topography of the surface of the wafer, and to find the position of the wafer edge.

24 Claims, 15 Drawing Sheets

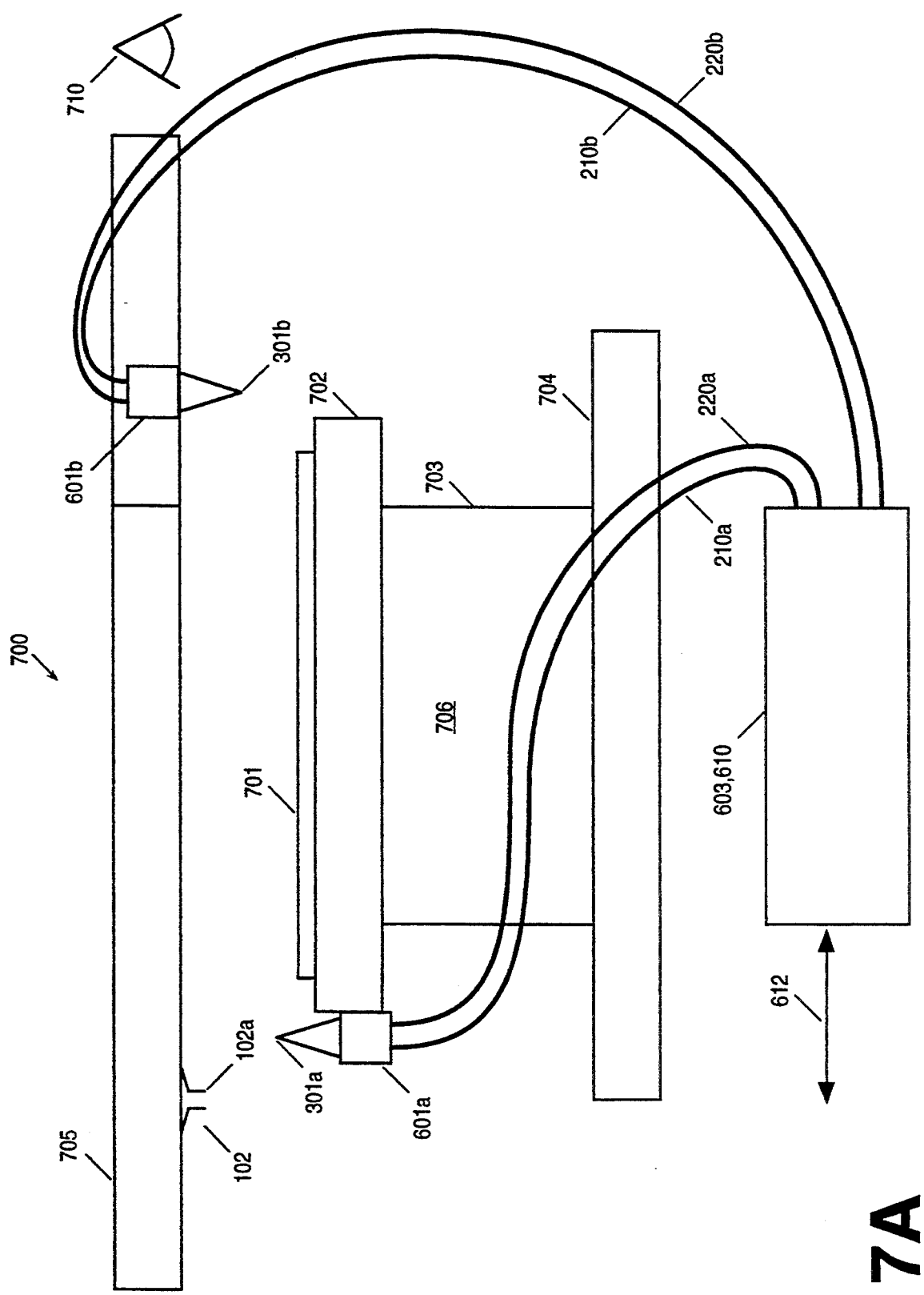

METHOD AND APPARATUS FOR DETERMINING AN OBJECTS POSITION, TOPOGRAPHY AND FOR IMAGING

BACKGROUND OF THE INVENTION

1. Field of the Invention

The present invention relates to a method and apparatus for determining the position and topography of an object, and for imaging the surface of the object, and more specifically to a method and apparatus for automatically aligning probe tips to probe pads on a semiconductor wafer.

2. Background Information

After semiconductor circuits have been fabricated on the surface of silicon wafers, they must be tested electrically before the expensive step of dicing and packaging can begin. Test machines that manipulate wafers and arrange for electrical contact to be made with the devices on a wafer are called probers. Electrical signals that test the device are then provided by a separate tester, sometimes referred to as the Automatic Test Equipment or ATE. Probers allow test engineers to precisely contact pads within a device with test probes. The probes come on probe cards that are inserted into the prober machine. The probe card is the interface between the die under test (DUT) and the device tester or ATE. Before contact can be made, an operator must first align the first die to the probes. This is usually done by means of a microscope through which the operator can observe the probes and the device simultaneously. After alignment to the first die is made, the alignment is remembered by the prober, and, given the die size, the prober can then step across the wafer automatically from die to die.

There are several types of probe cards. The most popular are cantilever probe cards in which the probes are needles that are nearly horizontal except at the tip where they are bent sharply downward to contact the device under test. The cantilever probe cards are typically limited to a maximum of approximately 500 probes and testing frequencies under approximately 100 MHz. The cantilever probe typically has a probe tip having a diameter of approximately 1-3 mils (i.e., 1-3 thousandths of an inch), depending upon the size and type of pad to be contacted. Another newer type of probe card is the membrane card that uses a flexible membrane, such as a polyimide membrane, with deposited electrical traces and contact bumps which make contact to the DUT. The electrical traces carry signals to and from the DUT. This type of probe card can have 1200 bumps or more and can be used at testing frequencies well into the GHz region. The membrane probe card contact bump typically has a diameter of approximately 3 mils. A third type of probe card is the IBM COBRA ™ probe. The COBRA probe uses vertical spring loaded pins to contact the DUT. The COBRA probe card can have over 2000 probes and can be used at testing frequencies well into the GHz regions. Pointed tips having a diameter of approximately 1 mil are used to probe, for example, aluminum or silicon pads, while a flatter probe tip having a diameter of approximately 5 mils is used to probe solder bumps. While the cantilever probe cards have visual access from the top to allow an operator, using a microscope, to align probes to pads, the newer membrane and COBRA probe cards have limited or no access. Thus for theses newer cards, automatic probe-to-pad alignment is necessary. Even for cantilever probe cards, however, automatic probe-to-pad alignment is highly desirable, especially for high pin count applications. In addition to the probe cards described above, other probe cards and tips are well known.

One method for automatic probe to pad alignment (APTPA) is an upward looking camera. This method utilizes a camera to take a picture of a region having the probe tips. The picture produces an image of several probe tips in two dimensions, thus allowing for determination of the position of the probe tips in a plane (e.g., the x-y plane), typically parallel to the plane of the prober stage holding the wafer. The position of the camera relative to the prober's stage is known, so that the x and y coordinates of the probe tips relative to the stage can be determined. Auto-align optics, comprised in a separate imaging system, determine the position of the probe pads on the wafer relative to the stage, so that the position of the probes relative to the pads can be determined, and the stage can be moved by a controller such that the probes are in alignment with the pads in x and y. One drawback with this method is that an additional system is necessary to determine accurately the z coordinate of the probe tips relative to the DUT, so that the pad can be contacted with sufficient force to provide for good electrical contact, without using excessive force that will damage the DUT. A further disadvantage of this method is that the camera system is relatively expensive, greatly adding to the overall cost of the prober.

Another method of APTPA is the use of a dummy wafer in conjunction with auto-align optics. First, the z position of the prober relative to the dummy wafer is determined using a separate system. Next, the dummy wafer, having a soft, markable surface such as an aluminum layer, is probed. Next the marks left by the probe tips on the dummy wafer are examined by the auto-align optics. Thus, knowing the position of the optics relative to the stage, the x-y position of the probe tips relative to the stage can be determined. This method, like the previous method, has the drawback that a separate system to determine the z position of the probe tips is required. Additionally, this method requires the production, inventorying, and tracking of dummy wafers. Additionally, an operator is usually required to load the dummy wafer into the system. Finally, scratches, contamination, and other stray markings can cause the system to fail to determine the positions of the markings.

What is needed is a method and apparatus for determining the position of an object, such as a probe tip, to allow for alignment of the object to another object such as the pads on a device to be probed. The method and apparatus should be able to determine the position in all three dimensions, x, y, and z. Further the method and apparatus should be fully automatic, so that the alignment can be performed automatically, without operator intervention. Finally, the method and apparatus should be relatively inexpensive to implement on a wide variety of systems such as, for example, semiconductor wafer probers.

SUMMARY OF THE INVENTION

The present invention comprises a method and apparatus for determining the three dimensional position of a point on an object by providing a beam of radiation, focusing the beam to a focal point, focusing reflected radiation from the object to a detector and measuring the intensity of the reflected radiation at a plurality of locations of the object relative to the focal point. In one embodiment, a confocal arrangement is used, wherein a single optical fiber provides the source radiation to the probe head, and transmits the reflected radiation back to the detector. In this embodiment, a high point in the intensity is detected when the object is at the focal point. In another embodiment, a quasi-confocal arrangement is used, wherein a first optical fiber transmits the source radiation, and one or more sense optical fibers located proximate to the source optical fiber transmit the reflected signal back to the detector. In this embodiment, a null point is detected at the focal point, with peaks in intensity immediately in front of and behind the null point. In another embodiment, both the confocal probe and quasi-confocal probe are provided, with a first optical fiber providing the source radiation for both probes. In further embodiments, arrays of optical fibers are utilized to provide for increased data collection, increased speed, decreased sensitivity to noise, and any number of either or both of the confocal and quasi-confocal probes. An illustrative use of the present invention is to find the location in x, y, and z of probe tips on a wafer prober. Further illustrative uses of the method and apparatus of the present invention to profile the wafer surface, to provide a topographical map of the wafer's surface, and to locate the wafer's edge, are also disclosed.

Other features and advantages of the present invention will be made apparent from the detailed description which follows.

BRIEF DESCRIPTION OF THE DRAWINGS

The present invention is illustrated by way of example and not limitation in the accompanying figures in which:

FIGS. 7A–7C illustrate an embodiment of the present invention used in the probing of a semiconductor wafer.

DETAILED DESCRIPTION

A method and apparatus for determining an object's position, topography and for imaging is disclosed. In the following description, numerous specific details are set forth such as specific materials, system components, dimensions, etc. in order to provide a thorough understanding of the present invention. It will be obvious, however, to one skilled in the art that these specific details need not be employed to practice the present invention. In other instances, well known materials or methods have not been described in detail in order to avoid unnecessarily obscuring the present invention.

Figure 1:
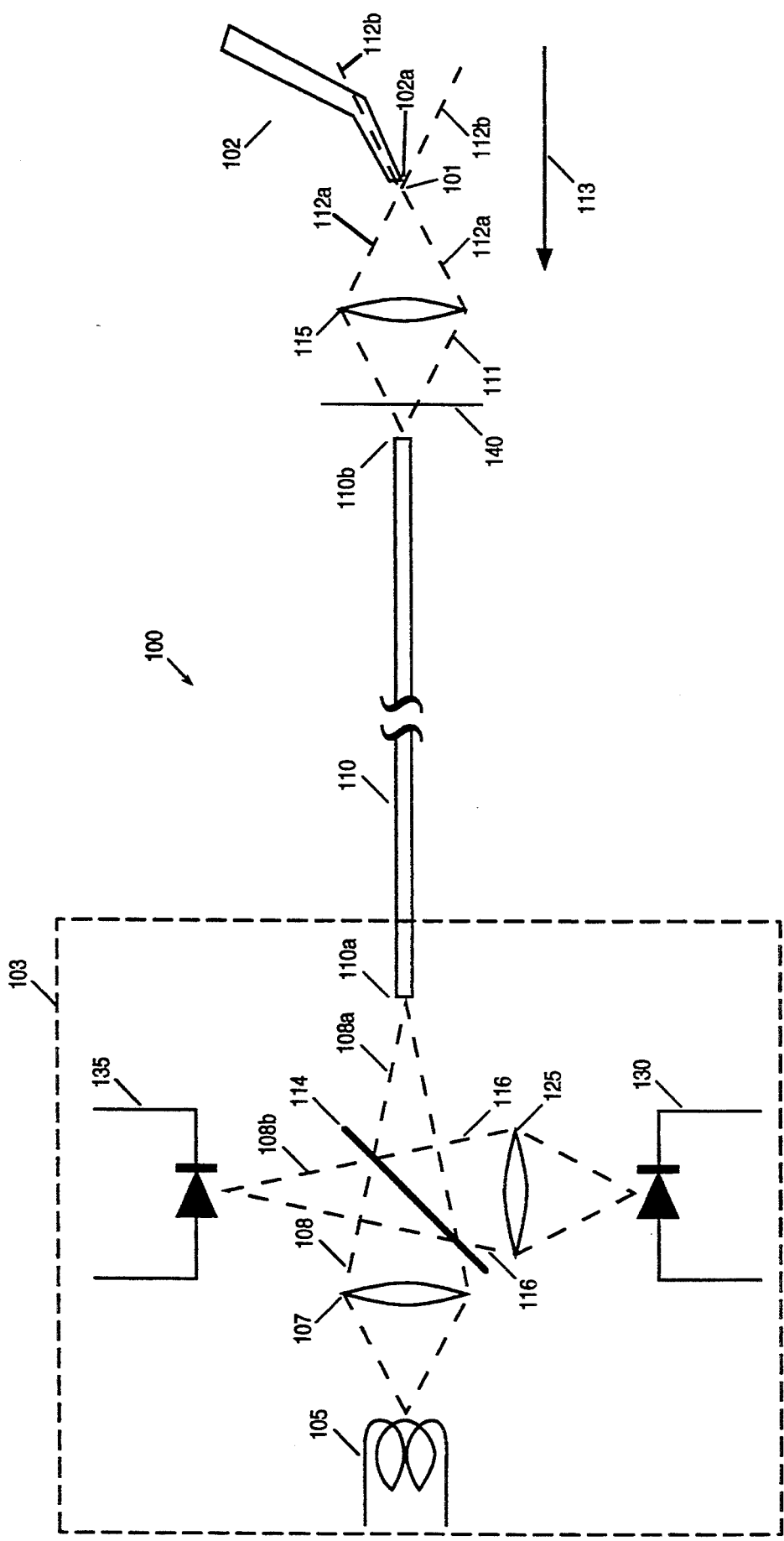
FIG. 1 shows a currently preferred embodiment of the microprobe of the present invention.

FIG. 1 shows a first preferred embodiment of confocal microprobe 100 of the present invention. Confocal microprobe 100 comprises light source 105, lenses 107, 115, and 125, beam splitter 114, optical fiber 110, detector 130, reference detector 135, and chopper wheel 140. Light from source 105 is focused by lens 107 to the first end 110a of optical fiber 110. Light exiting a second end 110b of optical fiber 110 is focused by lens 115 to focal point 101. Source 105, detector 130, reference detector 135, and the associated optical components together make up source/detector module 103. As used herein, the term lens is not restricted to a single optical lens, but encompasses any one or more components used to focus radiation. In a currently preferred embodiment, each of the lenses 107, 115, and 124 comprise a pair of identical doublet lenses arranged back to back to provide for a magnification of unity, so that the spot size of the focused light is the same as the size of end 110b of optical fiber 110. Other lens arrangements and magnifications may obviously be used. Further, each lens is achromatic. With an achromatic lens all light from a polychromatic source such as an incandescent bulb, will be focused in nearly the same plane. If a source with a narrow wavelength band is used, an achromatic lens may not be necessary. Optical fiber 110 has a core diameter in the range of approximately 100 $\mu$m, and a total diameter (core plus cladding) in the range of approximately 140 $\mu$m in a currently preferred embodiment. Additionally, optical fiber 110 may comprise a jacket and an additional hard covering. Also, in a currently preferred embodiment, light source 105 is a 7½ watt incandescent light bulb, so that in a preferred embodiment optical fiber 110 operates in the transmission mode. Alternatively, other light sources, such as LEDs, laser diodes or gas lasers can be used. Additionally, although the present invention is described in conjunction with light, it will be appreciated that radiation outside of the visible range can also be used. In the embodiment of FIG. 1, focal point 101 is approximately 12 mm in front of lens 115.

As shown, a portion of probe 102 is present in the vicinity of focal point 101. A portion of the light reflected by any object to the right of lens 115 will be reflected back through lens 115. Light which appears to come from focal point 101 will be focused onto end 110b of fiber 110. Reflected light which does not appear to come from focal point 101 will not be focused onto end 110b. The reflected light focused onto end 110b will exit the first end 110a where it is reflected off of beam splitter 114 as shown by dashed line 116. The reflected light is then focused by lens 125 into detector 130, which is shown as a photodetector in the figure. Alternatively, other types of detectors, such as a CCD array, for example, can be used. As shown in the figure, a portion of the source radiation 108, shown as 108b is reflected off of beam splitter 114 into reference detector 135. Reference detector 135 is used to eliminate the effect of any variations in light source 105 from the measurement of the reflected light from object 102. The use of reference detector 135 is optional, and is not necessary in many cases. The reference detector 135 is helpful for measurements which take place over a sufficiently long period of time such that draft in the output of light source 105 is a concern.

Light exiting end 110b of optical fiber 110 is approximately cone shaped as shown by dashed line 111. After passing through lens 115, the light resembles a converging cone 112a up to focal point 101 and then a diverging cone 112b. As an object or surface moves along the optical axis in the direction shown by arrow 113, for example, from right to left in the figure, light will be reflected back into the lens. Reflected light which appears to be emanating from the focal point will be refocused onto end 110b of the fiber. The closer an object is to focal point 101, the greater is the proportion of light reflected by it which appears to emanate from the focal point 101. Therefore, as the object moves from the right toward focal point 101, the intensity will increase. The intensity of the reflected light refocused onto end 110b will be a maximum when the object is at focal point 101. As the object is moved further to the left, the intensity of reflected light refocused onto fiber end 110b will drop. Thus, by moving the object relative to the confocal microprobe 100, the position of the object can be determined by noting the point at which a maximum intensity of reflected light occurs. This maximum intensity occurs when the object is at the focal point 101, which can readily be determined by a calibration routine. Assuming the position of confocal microprobe 100 is known relative to a reference position, the position of object 102 can thus be determined relative to the reference position.

Figure 1A:
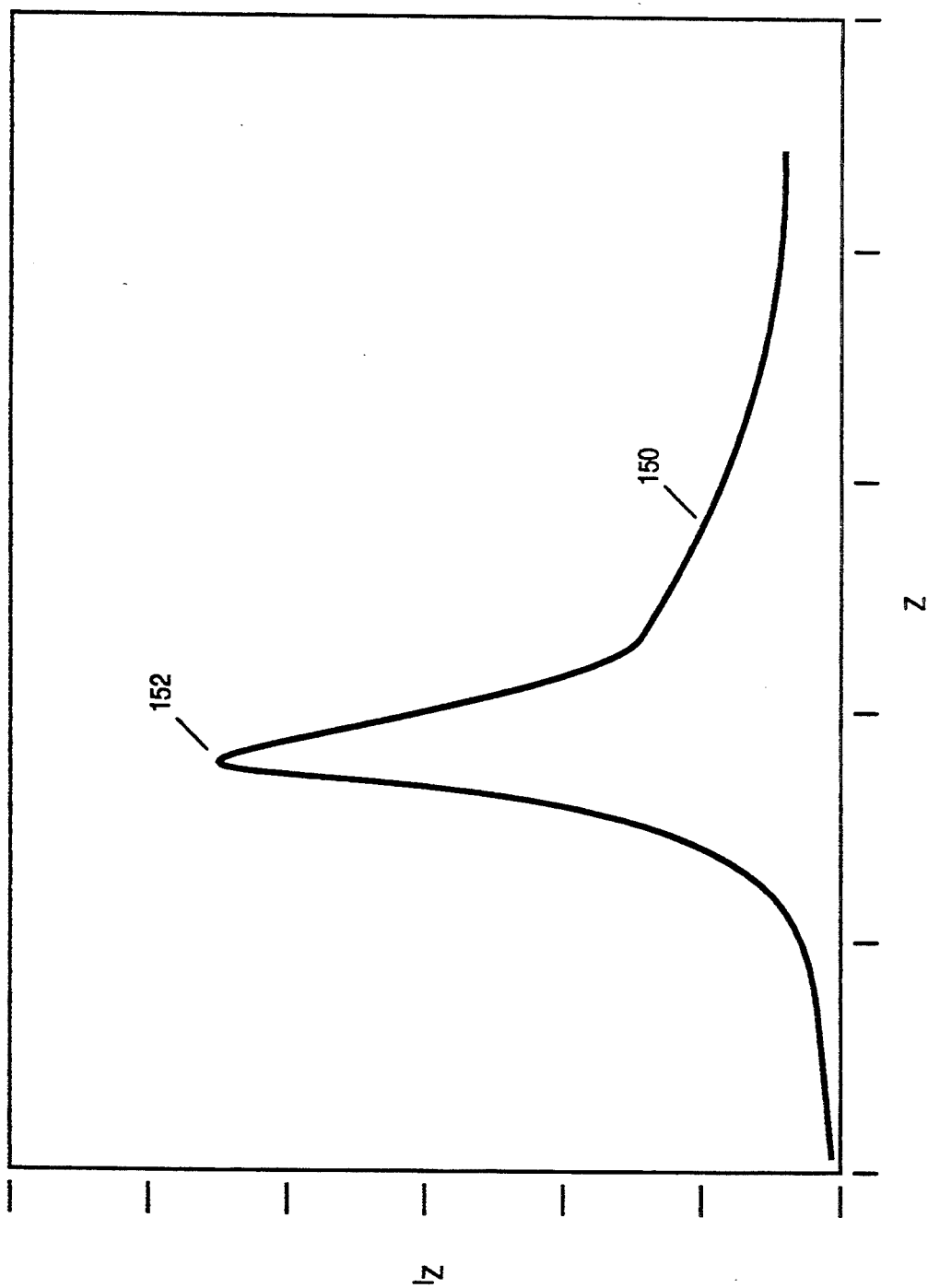
FIG. 1A shows an intensity distribution curve obtained from the embodiment of FIG. 1.

FIG. 1A shows a graph of the intensity of light detected by detector 130 of FIG. 1 as an object or surface is moved as described above. Curve 150 shows the intensity as a function of the object's distance from the lens. Peak 152 occurs when the object is positioned at focal point 101 of FIG. 1.

One problem that may occur with confocal microprobe 100, is high background, and therefore a low signal to noise ratio, due to light from source 105 randomly scattered by various components near fiber end 110a. One way of cutting down on this scattered light is to first focus the light to a pinhole at the position where source 105 is shown and then focus the light from the pinhole via lens 107 to fiber end 110a. This eliminates scattered light from the area surrounding the fiber end 110a, i.e., from the fiber chuck or ferrule and surrounding housing material. This arrangement has the drawback that precise alignment of all components is necessary. Additionally, there may still be some scattered light from, for example, reflection from fiber end 110a as well as light scattered off of other components such as reference detector 135. A method of reducing the effect of noise from background light is to chop the reflected light signal by means of chopper wheel 140. In this way, the light reflected from object 102 is an AC signal, whereas the background light is DC and can be filtered out.

Figure 2:
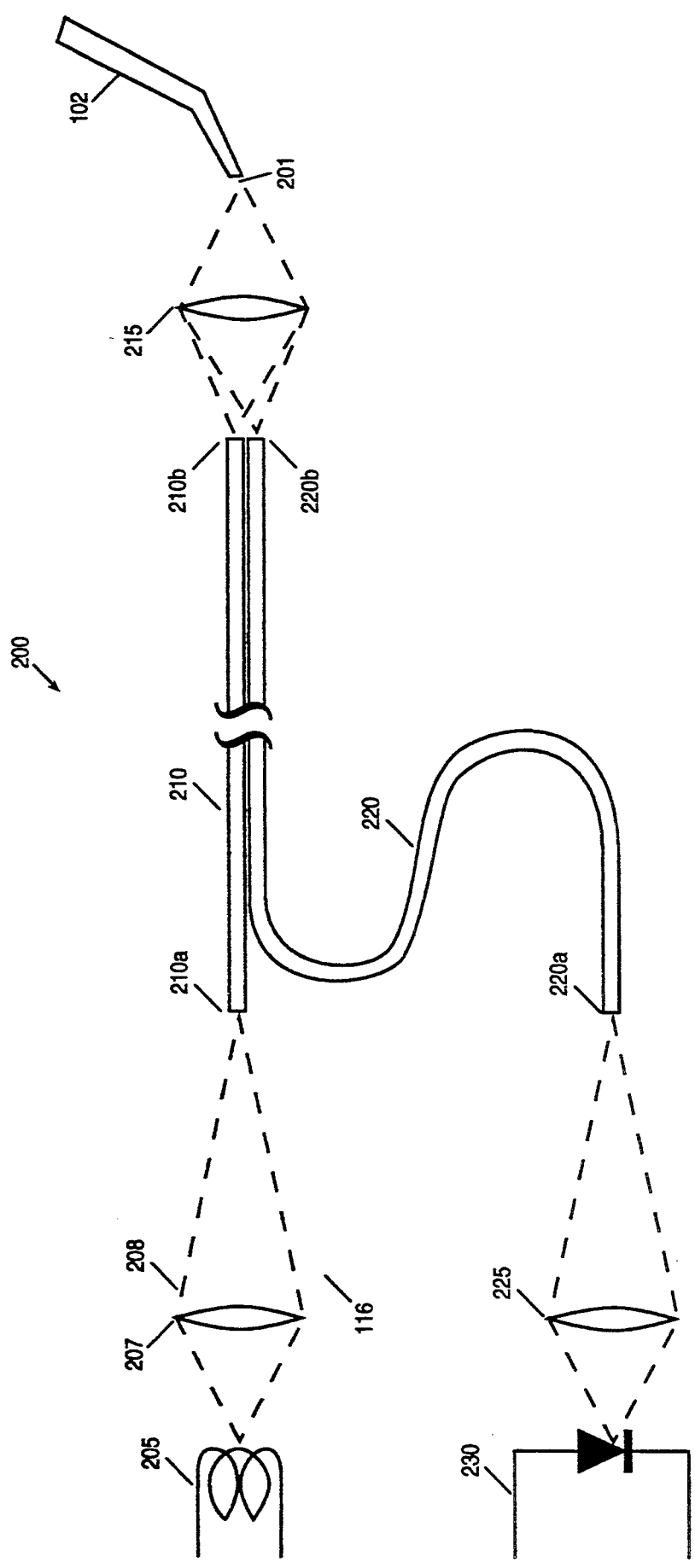
FIG. 2 shows a further currently preferred embodiment of the microprobe of the present invention.

FIG. 2 shows a further currently preferred embodiment of the present invention. Quasi-confocal microprobe 200 comprises light source 205, lenses 207, 215, and 225, optical fibers 210 and 220, and detector 230. In general, these components are the same as the corresponding components of confocal microprobe 100 of FIG. 1. In quasi-confocal microprobe 200, light from source 205 is focused by lens 207 into the first end 210a of a first optical fiber 210, also referred to as the source fiber herein. The light exits the second end 210b and is focused by lens 215 to a focal point. As will be discussed in more detail in relation to FIG. 3, light reflected from an object to the right side of lens of 215 is then focused by lens 215 to end 220b of a second optical fiber 220, also referred to as the sense fiber herein. The reflected light then exits end 220a of optical fiber 220 and is focused by lens 225 into detector 230.

Figure 3:
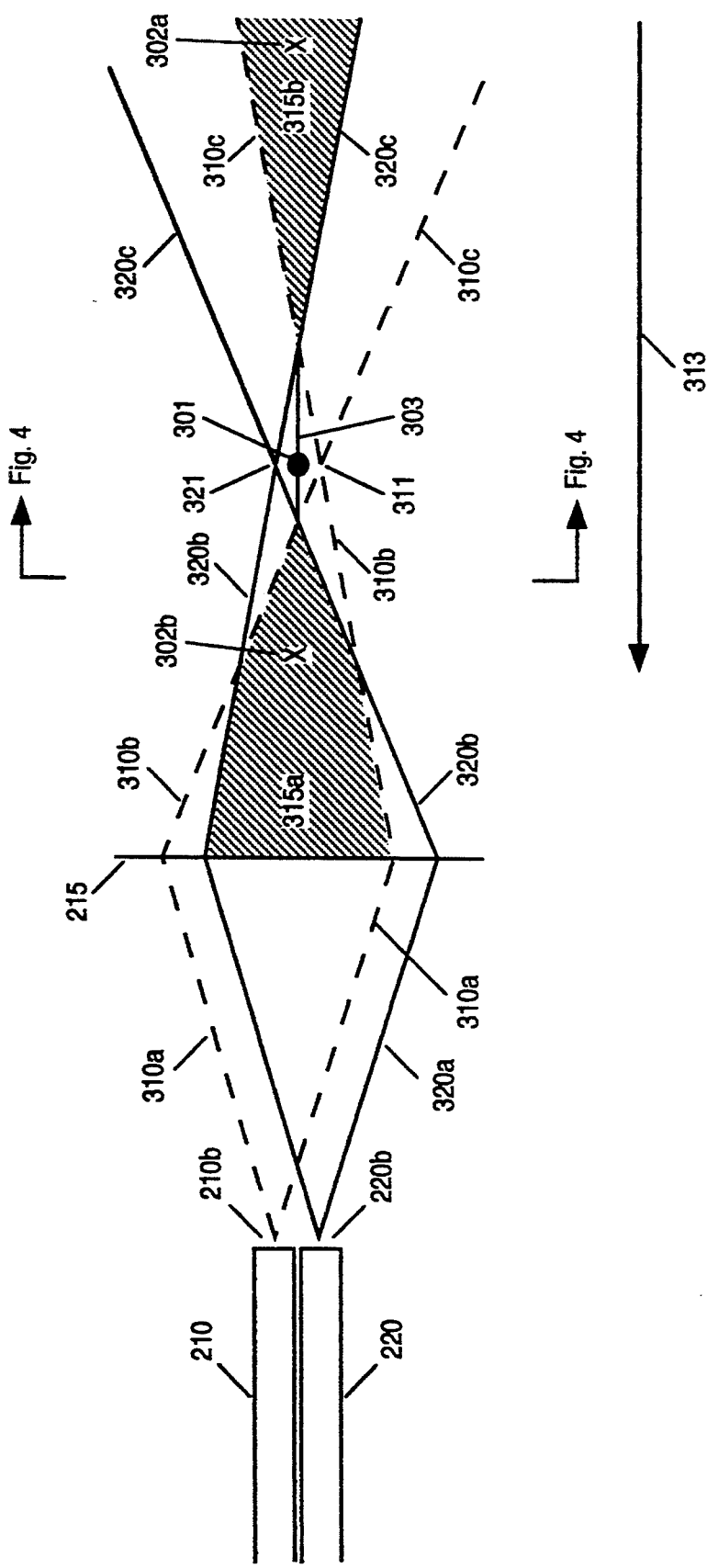
FIG. 3 illustrates the principle of operation of the embodiment of FIG. 2.

Referring to FIG. 3, the operation of quasi-confocal microprobe 200 will now be described. Note that as opposed to the confocal arrangement of FIG. 1, the optical paths of the source radiation through fiber 210 and lens 215, and of the reflected radiation through lens 215 and fiber 220 are no longer confocal, but rather are slightly displaced from one another. Herein, this relationship will be referred to as quasi-confocal. As shown in FIG. 3, light exiting end 210b of fiber 210 forms diverging cone 310a prior to striking lens 215. From there, the source light forms converging cone 310b and is focused at focal point 311. To the right of the focal point, the source light then spreads out in diverging cone 310c. It will be understood that the true shape of the light distribution is not perfectly conical, since the light exiting 210b is not a perfect point source, but has a finite diameter. However, the various cone shapes shown in FIG. 3 approximate the actual light distribution. Thus, on the right-hand side of lens 215, the source light will be mostly confined within the cones 310b and 310c, with the greatest intensity at focal point 311 and decreasing intensity to either the left or the right-hand side. The cones 310b and 310c will be referred to as the source cones herein. Focal point 321 represents the focal point of sense fiber 220. In essence, focal point 321 is the position an object must be placed in order to be focused onto end 220b of sense fiber 220. Therefore, any light passing through focal point 321 and passing through lens 215 is focused to sense fiber end 220b. Of course, any radiation originating from a point to the left of focal point 321 and traveling left, through lens 215 will also be focused on end 220b if its path, when extended to the right, would cross through focal point 321. Thus, cones 320b and 320c represent areas of space in which all light meeting this criteria is focused onto end 220b of sense fiber 220. The cones 320b and 320c will be referred to as the acceptance cones of sense fiber 220.

Figure 4:
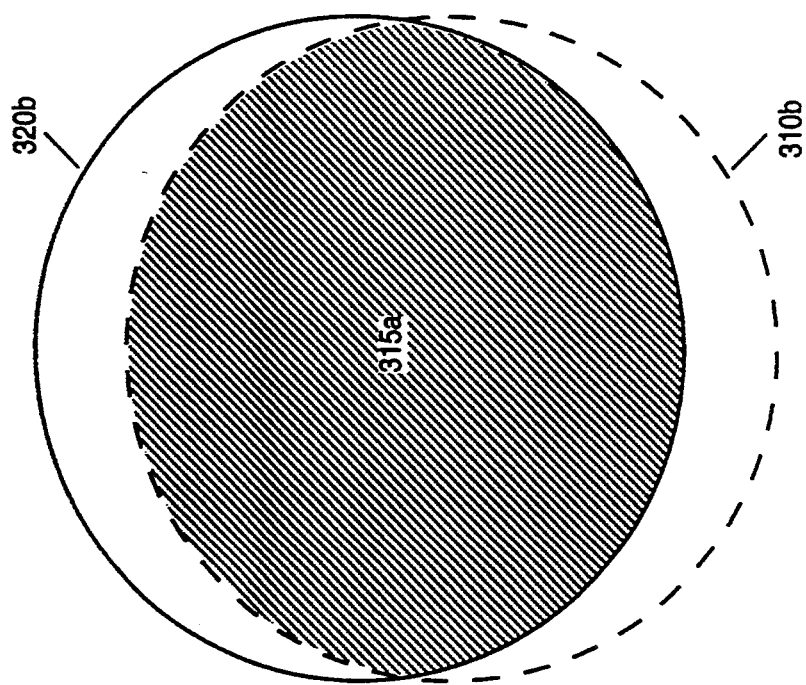
FIG. 4 shows a cross-sectional view of a portion of FIG. 3.

In light of the above, it can be seen that an object outside of either the source cones 310 or the acceptance cones 320 will not cause any light to be reflected back to end 220b of sense fiber 220. If the object is outside of source cones 310b and 310c, then, regardless of whether or not it is in an acceptance cone, it will reflect no light since no light is striking it. Similarly, if an object is outside of acceptance cones 320b and 320c, then, regardless of whether it is in one of the source cones 310b or 310c no light will be focused back on end 220b of sense fiber 220 since the object is not within the volume of space from which light is focused onto sense fiber 220. Thus, for an object to cause reflected light to be focused back to end 220b of sense fiber 220, it must be in the common volume of the source cones 310 and acceptance cones 320 shown as shaded areas 315 in FIG. 3. FIG. 4 shows a cross-sectional view of the source cone 310b and acceptance cone 320b taken through the portion marked in FIG. 3.

Figure 5:
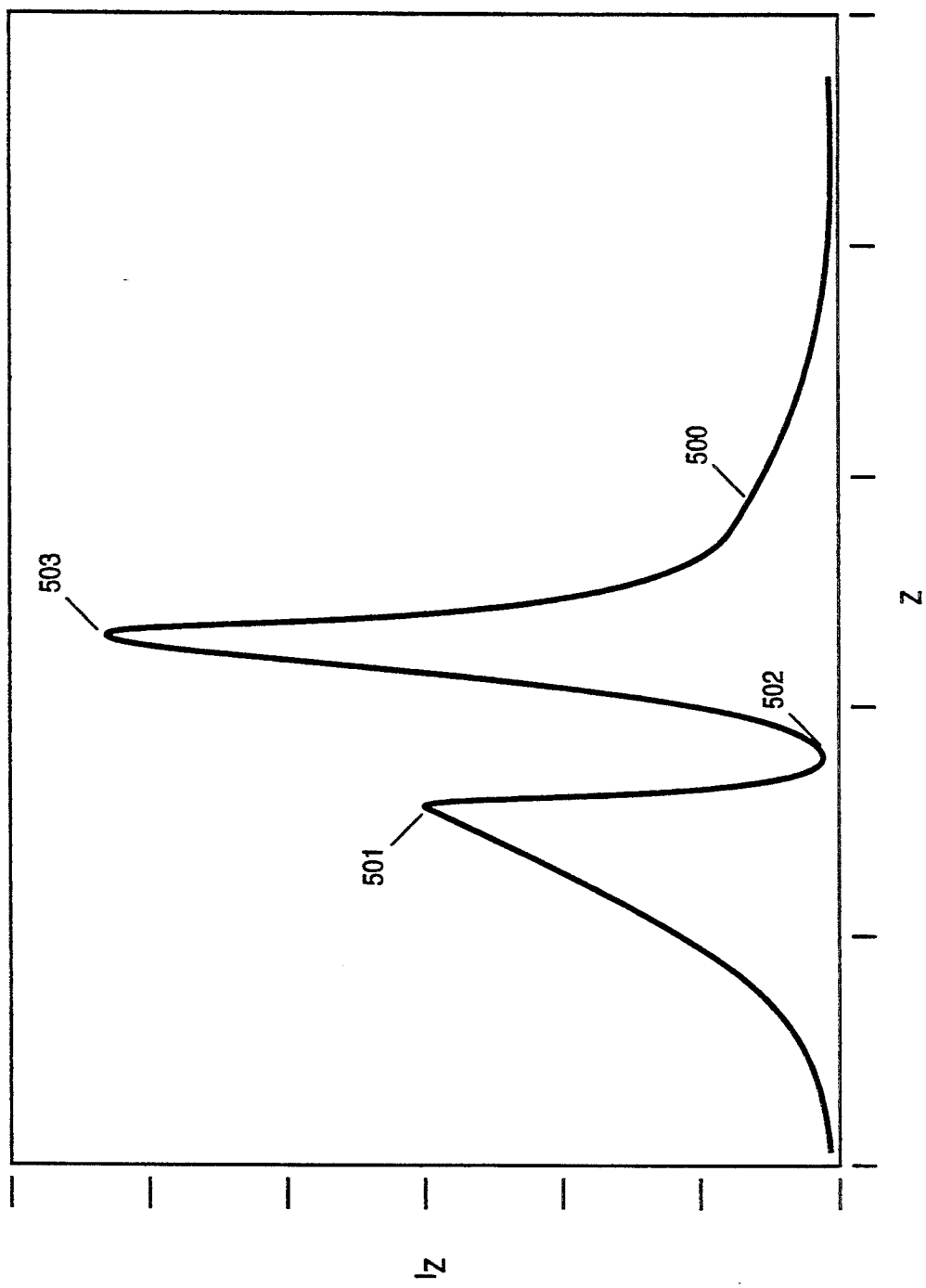
FIG. 5 shows an intensity distribution curve obtained from the embodiment of FIG. 2.

FIG. 5 shows a graph of the intensity of light detected by detector 230 of FIG. 2 as an object is moved in the direction indicated by arrow 313 of FIG. 3. This direction is denoted as the z-direction herein, as shown on the abscissa. The intensity of light as a function of the position in z of the object as it is moved from a distance towards the lens, $I_z$, is plotted along the ordinate. For example, assume object or surface 302, marked by an X, is moved from the position denoted 302a to position 302b. As the object or surface proceeds from right to left relative to the position of lens 215, the intensity of light increases from nearly zero intensity to a first peak 501. This increase is due to the fact that more light from the common volume 315b meets the criterion for refocusing onto fiber end 220b. After the first peak 501 is passed the intensity of radiation drops off sharply, as the object exits the common volume 315b, traveling along line 303. The intensity reaches null point 502, and then increases as the object enters common volume 315a. Shortly after the object enters common volume 315a, the signal rises to a second peak 503. As the object is moved farther to the left, the intensity decreases to the zero level. The null point 502 occurs when the object is at the position labeled 301 in FIG. 3, referred to as the null position, which is in the focal plane of focal points 311 and 321. To understand the response curve 500, referring again to FIG. 3, it can be seen that along the line 303 the object will be in neither the source cone 310 nor the acceptance cone 320. As mentioned earlier, the regions denoted by the various cones are not perfectly conical, so that some light may be present in the region outside of the denoted source cone 310, and some reflected radiation outside of acceptance cone 320 may reach end 220b of sense fiber 220. Therefore, the intensity is not at a minimum for the entire length 303. Rather, the null point 502 occurs when the object is at null position 301 because null position 301 is in the focal plane of focal points 311 and 321, where the source and acceptance cones are narrowest.

In practice, in a preferred embodiment using the system described above, peak 501 occurs when the object is approximately 11.2 mm from lens 215 and results in a photocurrent of approximately $5 \times 10^{-9}$ Amps. Null point 502 occurs when the object is at a distance of approximately 11.7 mm. The photocurrent at null point 502 is less than $0.5 \times 10^{-9}$ Amps., which is just slightly above background levels (i.e., the photocurrent at $z=0$ and $z=\infty$). Peak 503 occurs at approximately 11.9 mm, and results in a photocurrent of approximately $10 \times 10^{-9}$ Amps. The location of null point 502 will depend upon the magnification and focal length of the lens. In practice, quasi-confocal microprobe 200 is able to determine the position of an object with an accuracy of approximately $\pm 5$ $\mu$m or better.

As mentioned above, the null position 301 occurs approximately at the focal point of the lens 215 using the current embodiment of back-to-back achromatic paired lens. The exact null position 301 of a quasi-confocal microprobe 200 may vary depending on variations in the components such as lens variations, variations in optical fiber size, variations in system geometry, etc. However, the exact distance of null position 301 from a reference position can easily be determined by appropriate calibration. Since the null position 301, after calibration, is a known distance from the reference position, the position of an object relative to the reference position can readily be determined by moving the object relative to the lens along a portion of the distance between positions 302a and 302b, that is, along a line perpendicular to the focal plane of lens 215, and noting the position at which null point 502 occurs. This will be true regardless of the optical properties of The object. An object which is highly reflective may have higher peaks 501 and 503, for example, while an object which is relatively dark will have lower peaks 501 and 503. However, in all cases the central null 502 will always occur when an object is at the same distance from lens 215. To determine the position of an object, the intensity can be measured continuously as the object is moved, as described above, along a line perpendicular to the focal plane, i.e., at every position along the line, or the intensity can be measured at several discrete positions along the line. In either case, the method of the present invention essentially determines position based upon the measured intensity at a plurality of positions along the line. Note that no image of the object needs to be formed in order to determine its position. Rather, in the present invention, only the intensity of reflected light is measured in order to detect null point 502.

Figure 6:
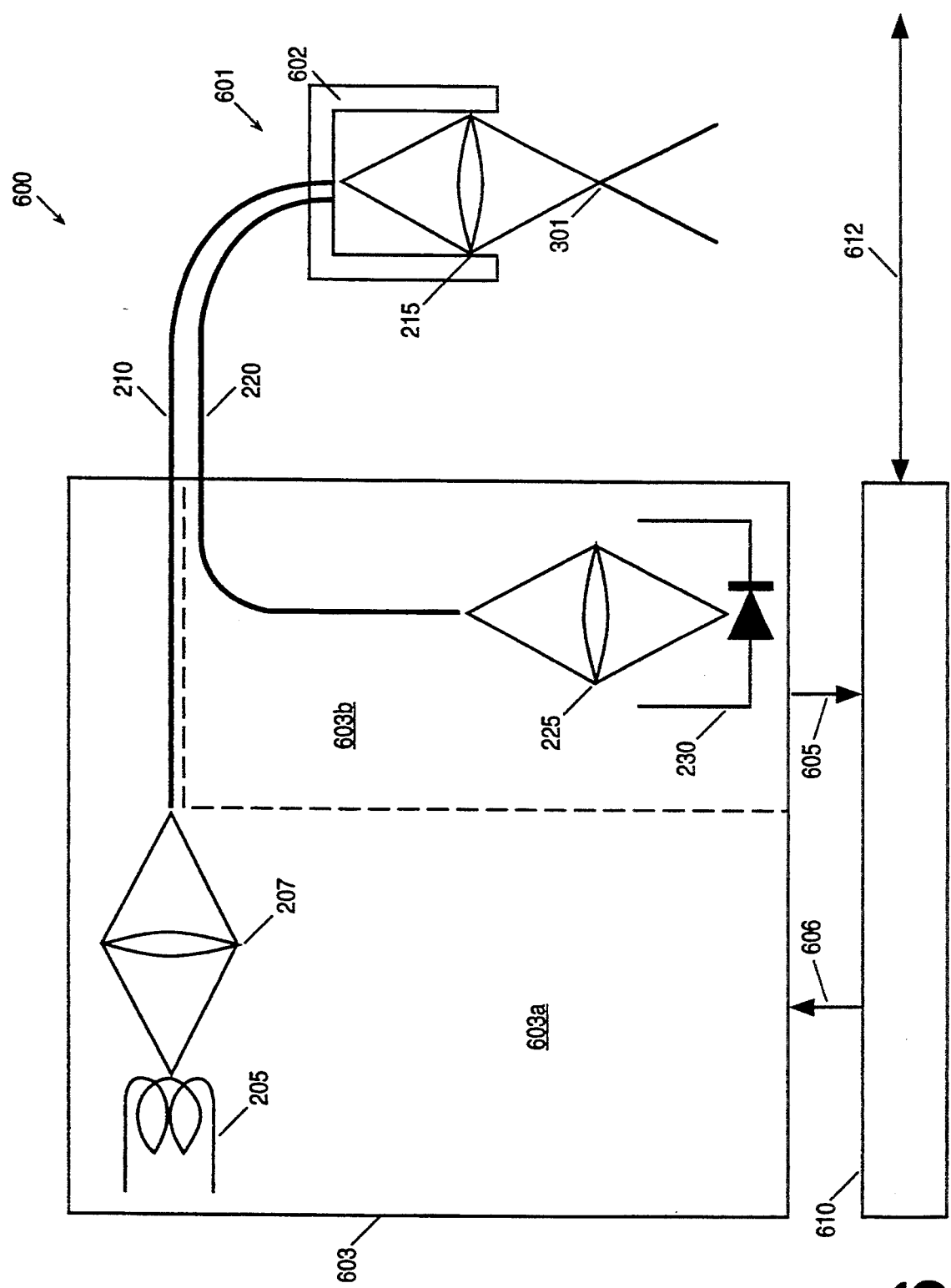
FIG. 6 shows the embodiment of FIG. 2 incorporated into a system having data collection and drive electronics.

FIG. 6 shows quasi-confocal microprobe 200 incorporated in system 600. System 600 includes head unit 601 which comprises housing 602, lens 215, and the ends of optical fibers 210 and 220. Source/detector module 603 includes light source 205, lens 207, lens 225, and detector 230. Source/detector module 603 is coupled by connections 605 and 606 to the data collection/drive electronics unit 610. Note that light source 205 is placed in compartment 603a of module 603, while detector 230 is placed in compartment 603b. The compartment 603b is designed so that no light from source 205, or from any other outside source such as room lighting, can reach detector 230. The ability to separate these components eliminates the problem of background noise due to source light scattered from the various components as discussed earlier in relationship to confocal microprobe 100.

In operation, head 601 is moved back and forth relative to the object to be probed. A signal as described previously in relation to FIGS. 3 and 5 is received by detector 230. The analog signal is converted to a digital signal by an analog to digital (A/D) converter and sent via connection 605 to data collection/drive unit 610. In practice, head 601 can be mounted in a fixed position, with the object to be probed mounted on a stage having, for example, a stepper motor to control the motion of the stage. Or alternatively, head unit 601 may be mounted such that it is movable. In the following discussion, the later embodiment will be described. Electronics unit 610 is coupled via connection 612 to the motor drive (not shown) controlling the motion of head 601. As electronics unit 610 receives the converted signal from detector 230, it will move head 601 up and down to collect data such as that shown in FIG. 5. Once the null point 502 of FIG. 5 is reached, the system will know the position of the object being probed in relation to head 601 since the position of head 601 relative to null position 301 will have been calibrated previously, as described above.

As described above, quasi-confocal microprobe 200 can be used to find the position of an object in relation to, for example, probe head 601 of FIG. 6. In addition to finding the position of an object, quasi-confocal microprobe 200 can be used to form a topographical map of a substrate. In essence, after finding the position of a point on the surface of a substrate, a point-by-point search can be performed, to find the position of each point on the surface. For example, after finding the z position of a first point, either the substrate and/or head 601 can be moved in the x-y plane to another point, and the process repeated. The resolution of the topographical image thus formed would depend upon the sampling rate in x and y which would be a matter of user choice. In general, the resolution is a function of the core and cladding size of the optical fibers, with a thin cladding in relation to the core preferred, and magnification of lens 215. In practice, a resolution of approximately ±2.51 μm is easily achievable in quasi-confocal microprobe 200 of the present invention.

The microprobe of the present invention can also be used to form an image of a surface. Once the topography of the surface is known, for example, by the method described above, head 601 is set to a height above the surface so that the return signal through sense fiber 220 is at peak 501 of FIG. 5. The head 601 then scans across the surface, with its z height position constantly adjusted so that it is always the same distance above the surface, i.e., always at the same point on peak 501. As the head 601 scans across the surface, the return signal will vary according to the reflectivity of the surface. Thus, a point-by-point map of the surface reflectivity is created to produce a surface image. It will be appreciated that the surface may not be planar.

Figure 7B:
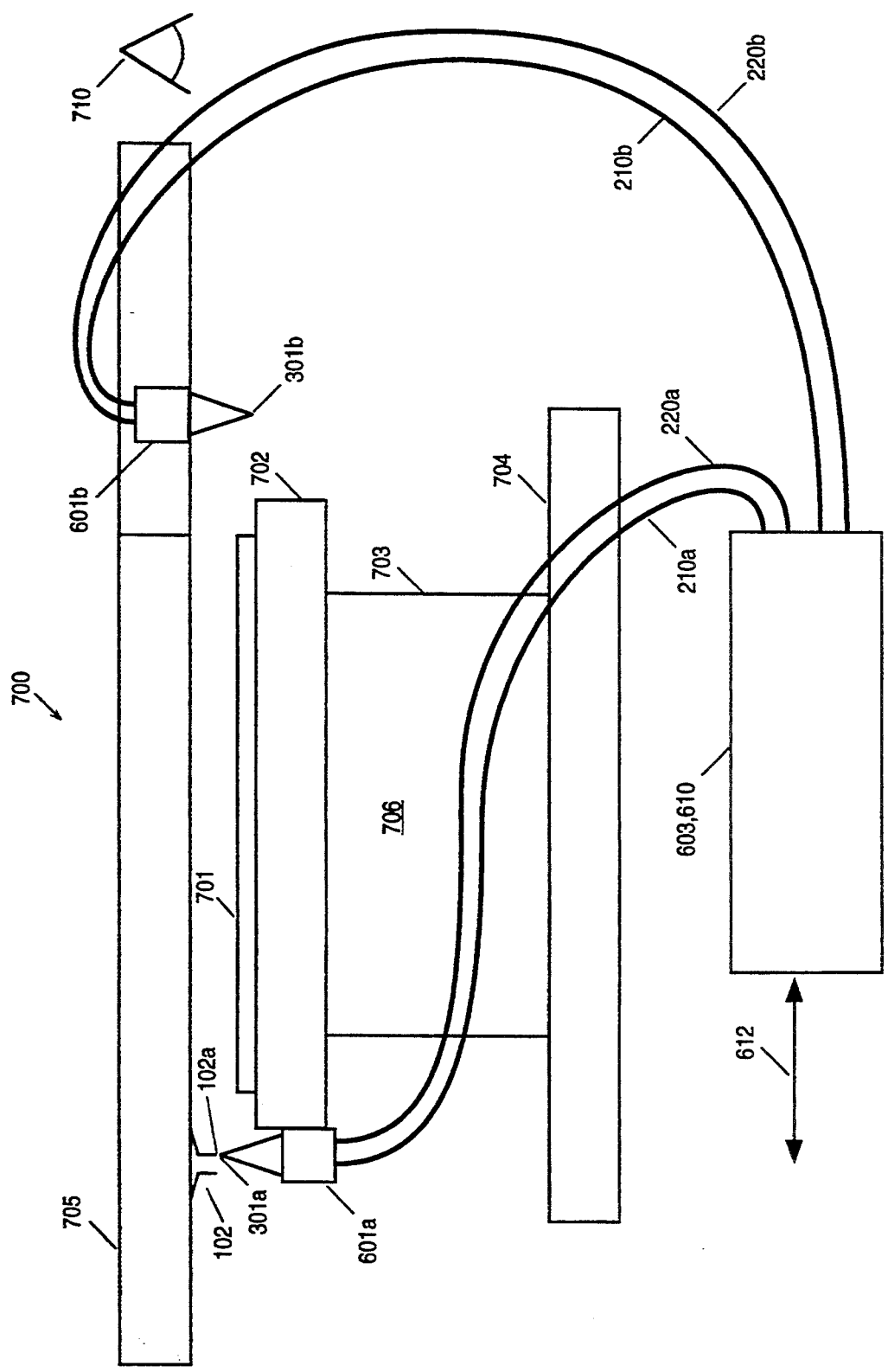
Figure 7C:
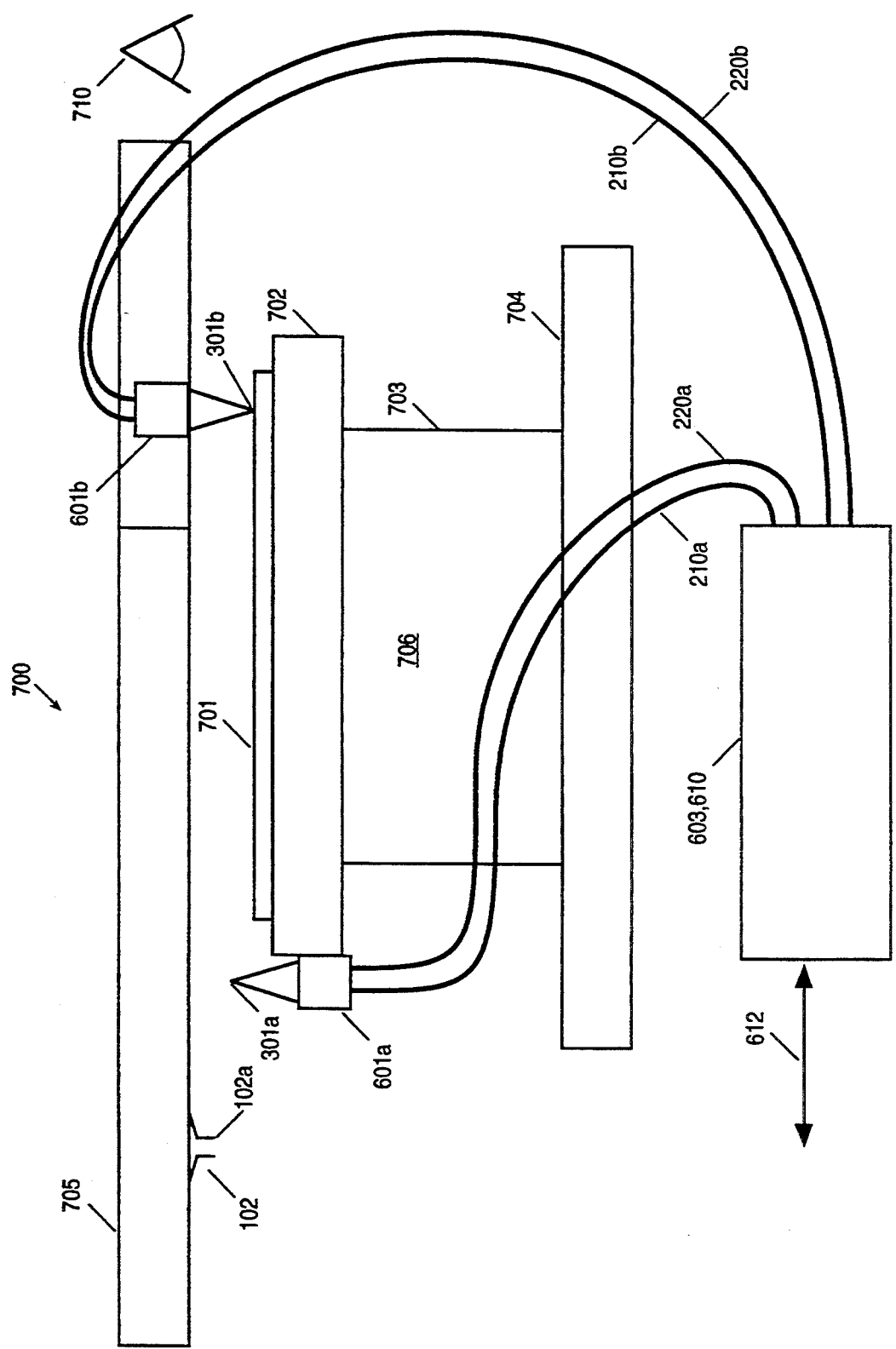

FIGS. 7A–7C illustrate system 600 incorporated in wafer prober 700 for use in the probing of semiconductor wafer 701, as described in the background section. Wafer 701 is placed on chuck 702 which sits atop Z stage 703. Z stage 703 controls the z (up-down) motion of chuck 702. Z stage 703 sits atop X-Y stage 704 which controls motion of the entire assembly in the x-y plane. Chuck 702, Z-stage 703, and X-Y stage 704 will be referred to collectively as stage assembly 706. In FIG. 7, the modules 603 and 610 are shown in a single enclosure. Additionally, system 700 comprises two microprobes having heads 601a and 601b, source cables 210a and 210b, and sense cables 220a and 220b. Either one or two light sources 205 and one or two detectors 230 are required, depending upon the configuration. The electronics unit 610 controls the drive motors for the stages 703 and 704 via signals sent through coupling 612. Electronics unit 610 receives a signal from these stages indicating their position. Prober 700 comprises probe card 705 having an array of probes 102.

As described previously, wafer 701 is to be brought up to the tips 102a of probes 102 to allow probing of a die's probe pads. Although cantilever type probes 102 are shown, it will be understood that the following applies to any type and number of probes for probing any one or more device die. The system 700 will know in advance the approximate location of the probes 102 relative to stage assembly 706. As noted earlier, it is necessary to know precisely the location of the array of probes 102 in x and y, in order to align the probes 102 over the probe pads on wafer 701. It is also necessary to know precisely the z location of probes 102 in order to ensure that the wafer 701 is brought in contact with probes 120 to ensure electrical contact, without damaging wafer 701.

It will be appreciated that many different types of search routines may be utilized to find an object such as a probe tip 102a with the microprobe of the present invention. In a currently preferred embodiment, the location of a probe tip is determined as follows. First, X-Y stage 704 is moved such that probe head 601a is underneath a reference surface, for example, the surface of the probe card 705 which is at a known location in z in relation to the probe 102. Next, Z stage 703 is moved in the z direction to find the null point as described previously. With this information, the system will know the approximate location in z of the probe tips 102a. Next, Z stage 703 is moved such that the expected z position of the tips 102a is in common volume 315b of FIG. 3, i.e., such that the probe tips 102a will be at a z location similar to that of the object at 302a of FIG. 3. To begin the search, X-Y stage 704 is moved to a starting position based on the known configuration of the probe card such that the focal point 301a is in line with the approximate location of the first tip to be probed. Next, X-Y stage 704 is moved, for example, in a spiral type search, from the starting position, until the probe tip 102a enters common volume 315b, such that a return signal is detected. Thus, at the initial stages of the search, a probe tip will cause a return signal even if focal point 301 a is not positioned at the x-y coordinates of the center of probe tip 102a. Once the probe head 601a is positioned such that a return signal is detected, indicating that probe tip 102a is within the common volume 315b, X-Y stage 704 then scans in x and y at constant z, similar to the imaging mode described previously, except that this scan is carried out at a point to the left of peak 501, since the common volume 315b is wider, and a greater volume of space can be explored. By noting the points in the x, y scan where a return signal is detected, a rough image of the tip is produced, from which its x-y coordinates can be determined. Next, X-Y stage 704 is moved such that the focal point 301a is at the x, y coordinates of the center of probe tip 102a. Then, Z stage 703 is moved up to find null point 502, to determine the z-position of the probe tip 102a. Thus, the position of probe tip 102a has been determined in x, y, and z. If desired, a further x-y scan in the imaging mode can be performed (i.e., microprobe 601a positioned such that the probe tip 102a is at the peak 501) to obtain more precise x-y data. In practice, numerous different computerized search routines using the signals received from the microprobe of the present invention can be used in conjunction with approximate starting locations to search for the probes in succession. Intelligent routines which learn as data are collected can be used to minimize search time.

Typically, the location of an additional one or more probe tips 102a must be determined to determine the position of the array as a whole sufficient to ensure successful first die touch down. To achieve this, it is important to note that as an average over many probe locations the location of the array as a whole will be known more accurately than the location of an individual probe 102.

Referring to FIG. 7C, probe head 601b is mounted above assembly 706, pointing downward. Microprobe 600b can be used as an edge detector to find the edge of wafer 701, and as a surface profiler to profile the surface of wafer 701. Typically, the position of wafer 701 on chuck 702 will be known approximately to within approximately ±150 μm depending upon the accuracy of the mechanical handling system which places wafer 701 on chuck 702. In a preferred embodiment, X-Y stage 704 moves to assembly 706 to a position such that probe head 601b is above wafer 701 near its edge. Next, Z stage 703 positions chuck 702 such that the surface of wafer 702 is at the null position 301b, determined by detecting the null point 502 as described previously. The stage assembly 706 and therefore wafer 702 is next moved to the left by X-Y stage 704. During the scan, the null signal 502 of FIG. 5 is returned, so long as the position of wafer 701 is such that the null position 301b is at the wafer surface. Once the edge is reached, the edge of the wafer will cause a return signal to be detected (i.e., the z position of the wafer edge will be along the right peak 502 of FIG. 5), since the edge of wafer 701 is at a z position beyond the null position 301b. Alternatively, if wafer 701 has a straight edge, the return signal will be caused by wafer chuck 702. In practice, the location of the edge of wafer 701 can be determined to an accuracy of approximately within 8 μm.

In the context of wafer probing, a profile of the wafer surface i.e., the z location of the wafer surface, is needed in order to ensure proper contact between the probe tip and probe pad, as described earlier. To profile the surface of the wafer, assembly 706 is moved such that wafer 701 is positioned underneath scan head 601b. The wafer is moved up and down by z stage 703 until the null position 301b is at the wafer surface, determined by detecting the null point 502 of FIG. 5. The wafer is then moved to subsequent positions by X-Y stage 704 and the process repeated. This profiling function is essentially the same as the topographical mapping described earlier, except that typically, fewer points need be probed in order to obtain a profile compared with a topographical map. Typically, approximately 4-6 points of data at several spaced apart points on the wafer surface are sufficient to characterize the z position of the surface of the wafer.

For prober 700 to probe wafer 701, the position of the probe pads on wafer 701 must now be determined. Each pad is typically approximately 100 μm×100 μm or smaller. In a preferred embodiment, the position of the probe pads is determined by machine vision system 710. This system utilizes a camera to provide an image of the probe pads. From this image, the position of the pads is determined in relation to machine vision system 710, which is known in relation to other system components and/or an arbitrary reference position. Thus, with the image obtained the position of the pads relative to the stage assembly 706 can be determined. Finally, the position of the probes 102 has been determined as described above. Electronics unit 610 then directs stage assembly 706 to a first die to be probed. First, X-Y stage 704 positions the wafer in x-y, next, stage 703 moves chuck 702 and wafer 701 up to bring the first die to be probed into contact with probe tips 102a. Again, since the position of other die will be known in relation to the first die probed, the system can automatically move to the next die to be probed and continue the process. As described above, the position of the wafer's edge has been determined with microprobe 600b. With this information, the system can be instructed to skip non-functional die near the wafer's edge, to minimize probing time. Thus, utilizing the present invention, all die on wafer 701 can be probed without requiring human alignment or other interaction with prober 700. Further, since visual alignment is not required, there is no need to maintain an opening in probe card 705 to allow for visual observation of the probing or to provide for some other means of alignment. Thus, the density of probes 102 on probe card 705 is not limited to allow for alignment in the present invention.

Several alternative embodiments of the present invention will now be described. The following embodiments provide for one or more advantages including increased data collection, increased scanning speed, decreased sensitivity to direction of scan, decreased sensitivity to noise, and better detection of dark surfaces.

Figure 8:
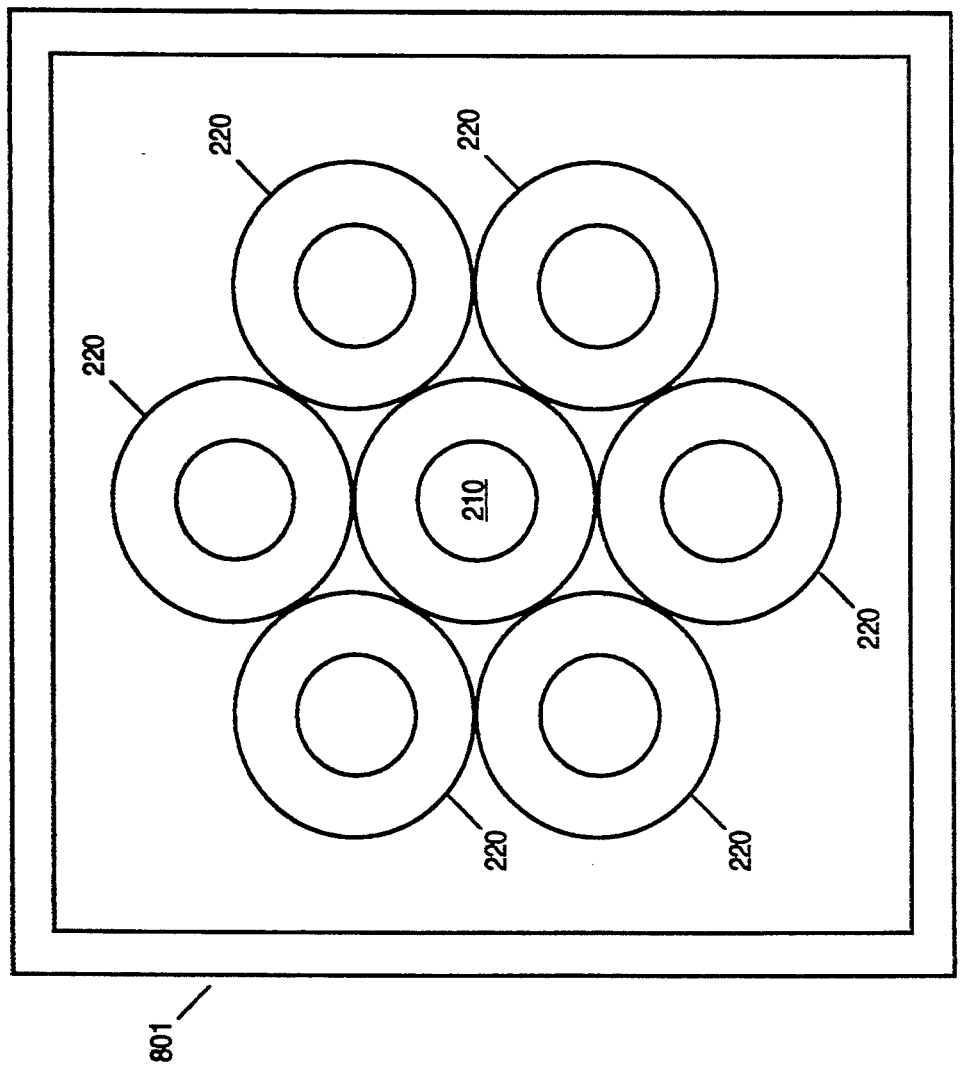
FIG. 8 illustrates a further currently preferred embodiment of the present invention utilizing several sense fibers.

As described earlier, to find the edge of a wafer, the probe head is positioned in relation to the wafer such that the null signal is returned, at a point near the edge of a wafer. The wafer or probe head is then scanned until a signal is detected indicating the edge has been reached. It will be appreciated that the exact location at which a return signal is seen may depend upon the direction from which the probe head approaches the wafer edge. To overcome this problem a plurality of sense fibers are utilized as shown in FIG. 8. FIG. 8 shows an end-on view of a portion of probe head 801, which is similar to probe head 601 except as described below. The view shown in FIG. 8 is looking into the probe head toward the ends of the optical fibers. As shown in FIG. 8, six sense optical fibers 220 are arranged hexagonally around source optical fiber 210. As shown, all of the fibers comprise a core and a cladding, as described earlier. In one embodiment the outputs of all six sense fibers 220 are fed into a single detector. Referring to FIG. 6, this embodiment essentially comprises a source module 603a and a detector module 603b, with the output of all six sense fibers 220 fed into the source detector module 603b. It has been found that this arrangement provides for a return signal that is essentially insensitive to direction. For example, in finding an edge of a wafer, the return signal is nearly identical regardless of the direction from which the wafer is approached. Additionally, on average, the return signal is increased in magnitude by approximately six times. In the surface profiling mode, this increased signal strength will provide for faster data collection, decreased noise sensitivity, and better detection of dark surfaces. It will be appreciated that other embodiments can be used using more or fewer sense cables 220. When a plurality of sense cables 220 are used, it is preferable to place them in a radially symmetric spacing.

In another embodiment of the present invention, a plurality of sense fibers 220 are provided wherein the output of each is fed into a separate detector. Referring to FIG. 6, this embodiment comprises a source module 603a, and six detector modules 603b, the output of each sense fiber 220 being fed into a separate one of the detector modules 603b. It will be understood that the individual detector modules 603b need not be housed in physically separate compartments. In this embodiment, each probe head 801 can explore a much greater volume of space, and in essence is equivalent to six individual microprobes. Therefore, the amount of data collected at a time is increased approximately six fold. As described in conjunction with FIG. 7B, when a probe is searched for using a single source fiber 210 and a single sense fiber 220, microprobe 600 is positioned such that the probe tip 102a is beyond the null point i.e., in common volume 315b of FIG. 3. Using probe head 801, a volume of space approximately six times greater than a single common volume 315b is explored at one time. This increased volume of space explored leads to a decreased time to find an object whose position is unknown. Additionally, since the signal from each of the six fibers is analyzed separately, and since each provides distinct information about the x-y location of the object causing a return signal, the object's location can be determined much more rapidly. The combined effect of probing a larger volume of space, and of determining the location of an object by analyzing each of the six common volumes separately, greatly decreases search time. Note that the probe head 80i having each sense fiber 220 coupled to a separate detector can, if desired, function as the earlier described embodiment wherein all sense fibers 220 are coupled to a single detector, by combining the signals together in the electronics.

Figure 9:
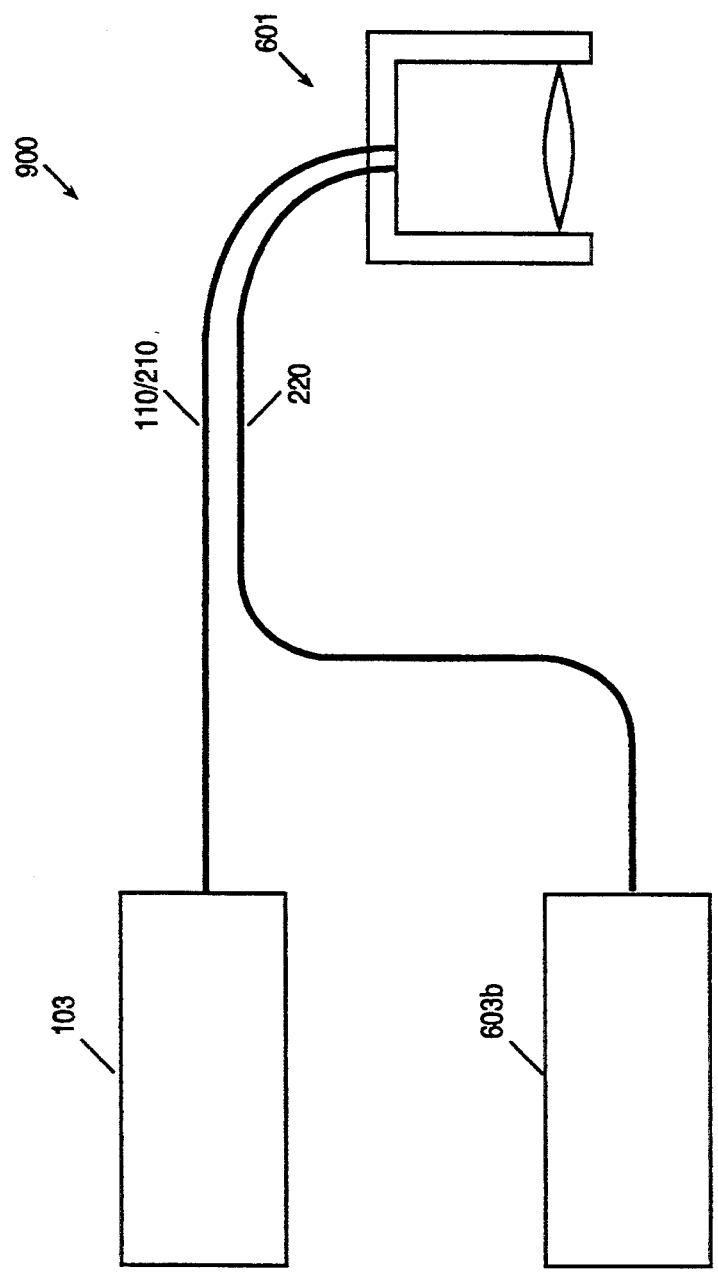
FIG. 9 illustrates a system incorporating the embodiments shown in FIGS. 1 and 2.

FIG. 9 shows a further embodiment of the present invention having both a confocal and quasi-confocal probe. The embodiment in FIG. 9 comprises a source/detector module 103, as shown in FIG. 1, having a light source, detector, lenses, and optionally a reference detector as described in relation to FIG. 1. Source fiber 110 provides the illumination to probe head 601 and carries a return signal back to source/detector module 103. As shown, this fiber also serves as source fiber 210 as described previously for the quasi-confocal arrangement. As before, sense fiber 220 provides a return signal to detector module 603b. When probing an object with the microprobe 900, detector module 103 will detect a return signal according to FIG. 1A, while detector module 603b will detect a return signal as shown in FIG. 5. The peak 152 of FIG. 1A will occur at the same point as the null point 502 of FIG. 5. Thus, with the combined confocal/quasi-confocal microprobe 900, all the data collected with the microprobe 100 and all the data obtained with the microprobe 200 is obtained simultaneously, thus increasing the amount of information gathered. Additionally, since the peak of the confocal microprobe occurs at the same point as the null point of the quasi-confocal microprobe, a crosscheck of the data is obtained.

In further embodiments of the present invention, the combined confocal/quasi-confocal microprobe 900 can be utilized in conjunction with the microprobe described in relation to FIG. 8 having a plurality of sense fibers 220. In such a case, a single source fiber acts as a source for plurality of sense fibers as described earlier. The sense fibers 220 may be combined into a single detector, or may be coupled to separate detectors as described previously. Therefore, the embodiment where each of the sense fibers 220 is coupled to a separate detector, one set of data corresponding to that shown in FIG. 1 A, and six sets of data corresponding to that shown in FIG. 5, are obtained simultaneously.

Figure 10A:
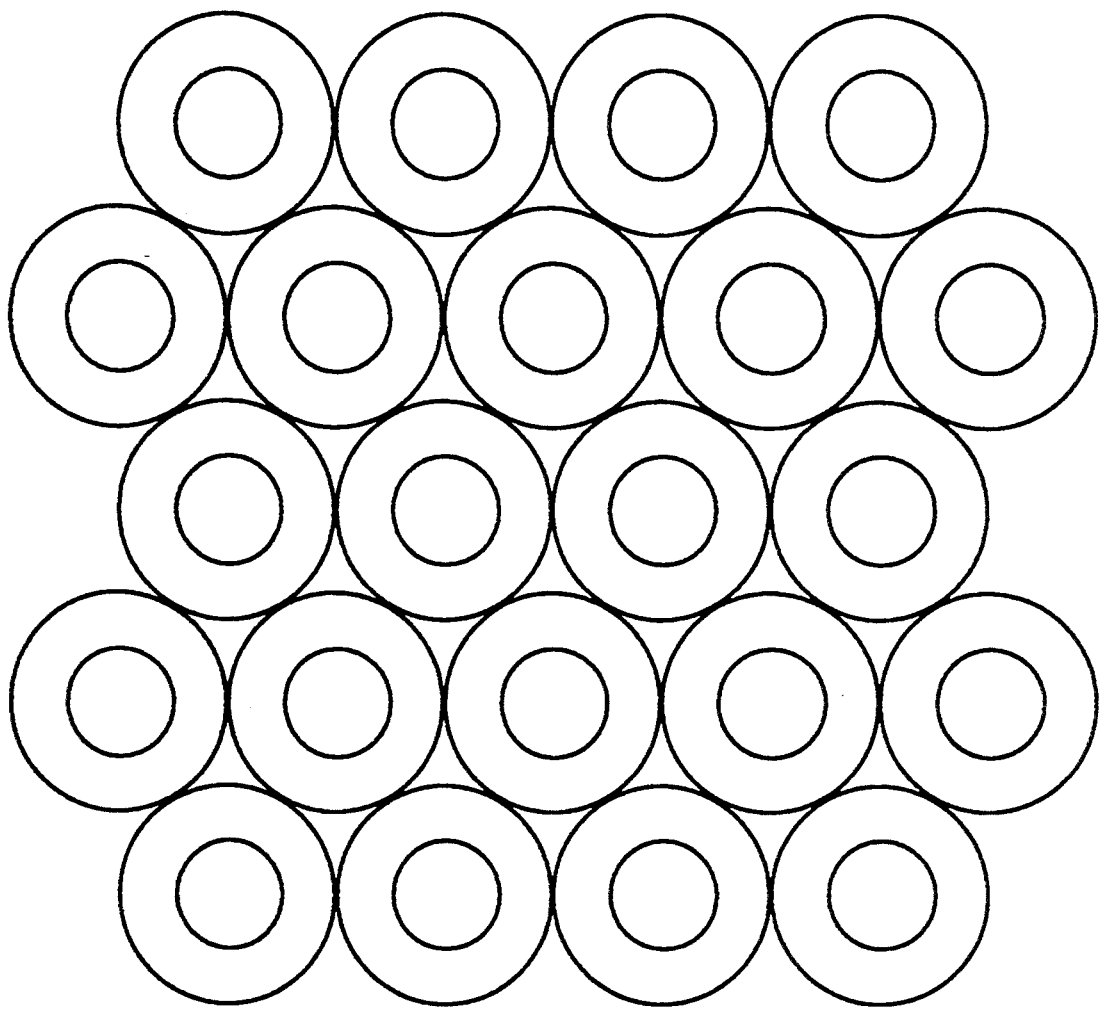
FIGS. 10A and 10B show two packing arrangements for a plurality of fibers.
Figure 10B:
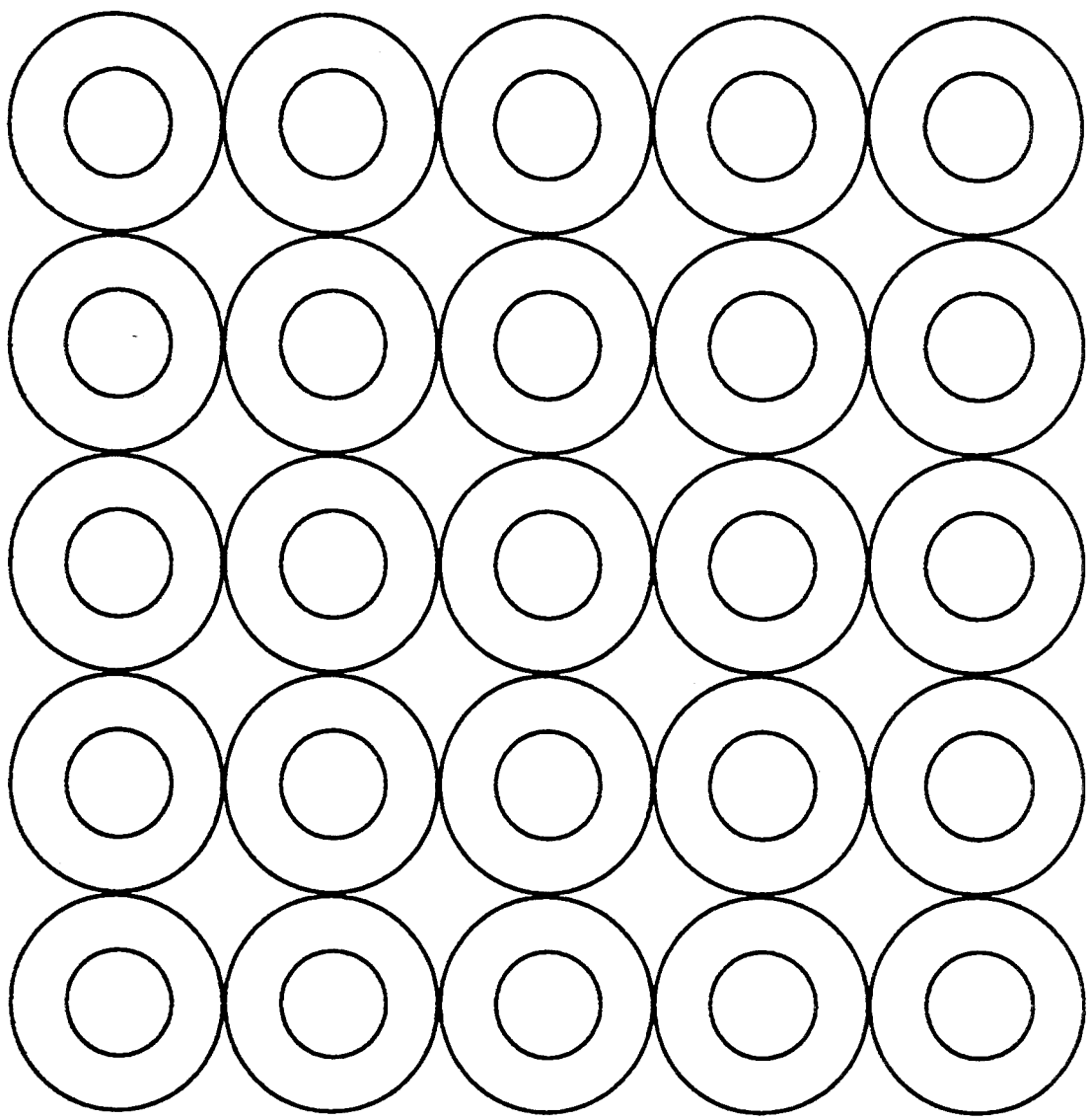
Figure 11:
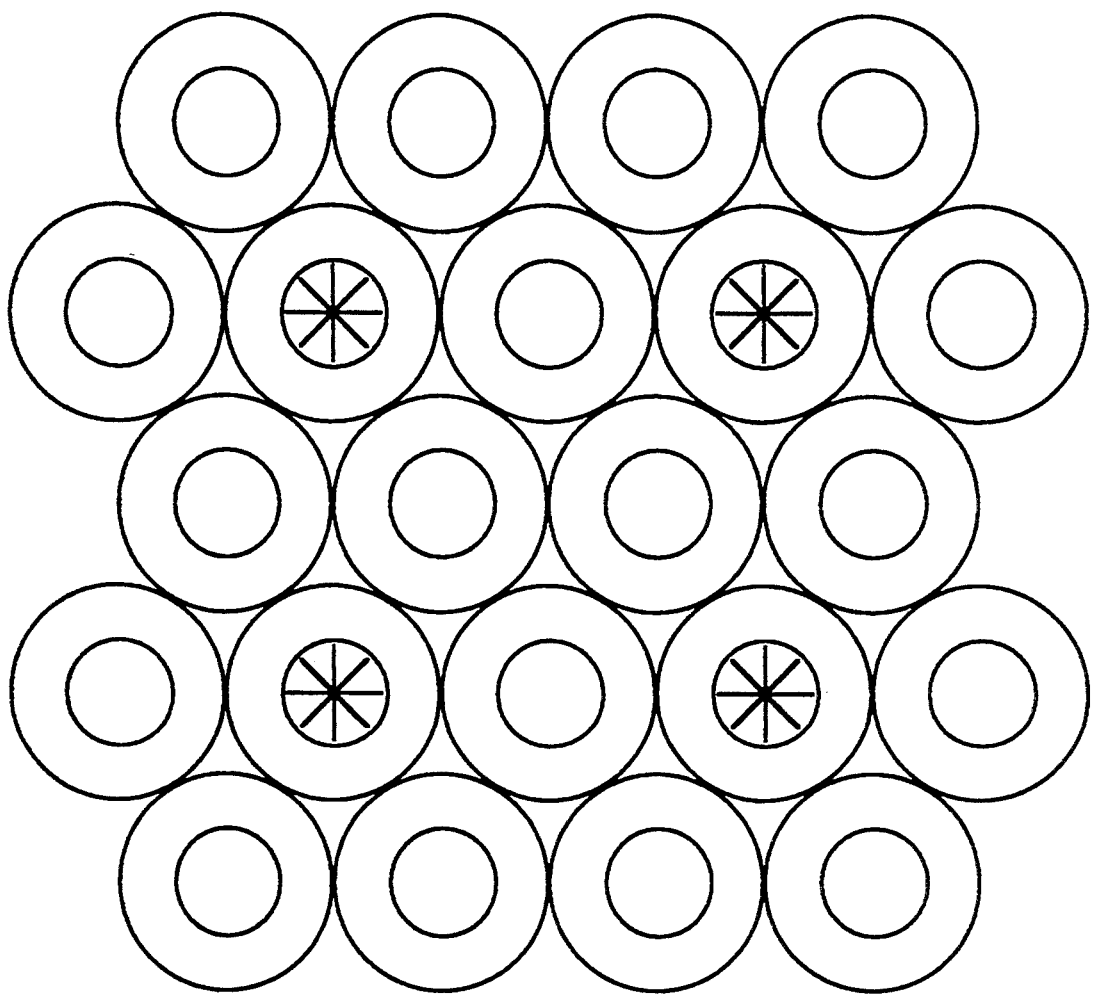
FIG. 11 shows an array such as that shown in FIG. 10A wherein several source fibers are used at one time.

When a plurality of fibers are used, the number, arrangement, and functionality (i.e., source fiber 210, sense fiber 220, or combined source and sense fiber 110/210) are not limited to the embodiments shown and described above. For example, referring to FIGS. 10A and 10B, the fibers can be arranged in an array containing any number of fibers. The arrays in FIGS. 10A, 10B, and 11 are not limited to the number of fibers shown. In these figures, the fibers have not been labeled as each fiber may be any one of the types of fibers described herein. FIG. 10A shows as an example, a hexagonal array, while FIG. 10B shows a rectangular array. In one embodiment, each fiber is coupled to a source/detector module 103. In this way, any single fiber can act as a confocal microprobe. Additionally, any one fiber can act as a source fiber 210 for one or more nearby sense fibers 20. In general, any fiber can be used as a confocal microprobe, while any two or more fibers can be used as a quasi-confocal microprobe or a combined confocal and quasi-confocal microprobe as desired. In the array, it is not necessary for each fiber to be coupled to a source or for each fiber to be coupled to a detector. For example, arrays can be configured with any combination of fibers of different functionality. For example, an array may have some fibers which function as source fibers only and some which function as sense fibers only, or an array may have some fibers which function as combined source/sense fibers and some which function as sense fibers only, etc.

In an array, the probe head need not be scanned in x and y as described previously. Rather, a surface can be profiled, or imaged, for example, by addressing the array electronically, turning on and off source fibers and detecting the return signals either in the confocal mode or quasi-confocal mode using one or more nearby fibers. Generally, only a single source fiber in one area of the array is used at any one time so that illumination from several source fibers does not interfere with neighboring microprobes. In a large array, several fibers can be turned on simultaneously if they are separated by a sufficient distance. Alternatively, mathematical models can be used to deconvolve the signals from neighboring source fibers. For example, FIG. 11 shows a portion of an array where four fibers, indicated with asterisks are used as source fibers. These fibers can each be used as a confocal microprobe, and/or as a source for neighboring sense fibers to be used in the quasi-confocal mode. As mentioned, the signals may be deconvolved mathematically. As a further alternative, the light from each source can be encoded, for example, by using a different wavelength, or using a pulsed source with each having a unique frequency, for example, so that the sense fibers can determine which source is providing the signal. In such a case, any number of source fibers can be turned on simultaneously, such that a large area can be probed at one time. Additionally, since each source is encoded, any sense fiber/detector 220/230 can usefully detect signals from several nearby source fibers simultaneously by filtering the resulting signal, such as by frequency filtering when the source is pulse frequency encoded, for example.

In a preferred embodiment, the lens of the present invention, for example, lens 215 of probe head 601 produces a 1:1 magnification. It will be appreciated that the lens could either magnify or reduce the source and reflected light. In general, a reduction results in a smaller spot size and a shallower depth of focus, resulting in a finer resolution. The tradeoff is that more data must be taken to determine z position and to produce an image. A magnification results in the opposite effects of a reduction. Other modifications could be made by one of skill in the art, for example, substituting different types or combinations of lenses for those described herein. For example, it has been found that the lens in front of the detector (lens 125 of FIG. 1 and lens 225 of FIG. 2) can be omitted, with the end of the optical fiber positioned directly in front of the detector. Further, alternative optical fiber sizes and modes may be used. Larger optical fibers will result in more light transmission. However, larger optical fibers may result in less resolution as the spot size will be larger. As a further alternative to the embodiment shown herein, the light source and the detector may be placed directly in the microprobe head. Referring to FIG. 2, a light emitting diode for example, can be placed at the position of end 210b of optical fiber 210. Additionally, a photo detector could be placed at the position of optical fiber of end 220b to detect the return signal. Similarly, in FIG. 8, a light emitting diode could take the place of the end of source cable 210. With a plurality of detectors taking the place of the surrounding sense optical fibers 220. One drawback of this alternative is that the source LED and the photo detectors are typically much larger than the respective ends of the optical fibers, thus limiting the resolution of the system.

Although the present invention has been illustrated with reference to specific applications, it will be appreciated that the invention is not so limited. For example, an object's position, topography, or image has been described as being determined by use of a certain portion of the response curve of FIG. 5. It will be appreciated that in many instances other methods than those described can be devised utilizing the response signal obtained by the microprobe of the present invention to determine position, topography, or image. Additionally, although the present invention has been illustrated in conjunction with the probing of a wafer, in order to find the probe tips, profile the wafer surface, and find the wafer edge, numerous other uses and applications using the teachings of the present invention are within the scope of the invention.

Thus, a novel microprobe as been described. The microprobe of the present invention allows for automatic determination of, for example, probe tips, wafer, and pad position, thus allowing operator-free probing of a semiconductor wafer.

What is claimed is:

1. A method of determining a position of a point on an object comprising the steps of:
    providing radiation;
    focusing said radiation to a focal point, said focal point being in a focal plane;
    focusing reflected radiation from said object to a first site;
    measuring a first intensity of said reflected radiation incident upon said first site;
    determining said position of said point on said object in three dimensions relative to a reference position based upon said first intensity.

2. The method as described in claim 1, wherein said radiation is focused by a first lens and said reflected radiation is focused by said first lens.

3. The method as described in claim 2, wherein said radiation is provided from a source through an optical fiber, said source providing said radiation to a first end of said optical fiber, said radiation transmitted through said optical fiber and exiting a second end of said optical fiber located at said first site, and wherein said reflected radiation is focused back to said second end of said optical fiber, said reflected radiation transmitted through said optical fiber and exiting said first end, said reflected radiation directed therefrom to a detector.

4. The method as described in claim 3 further comprising providing a plurality of optical fibers, said method further comprising selecting at least one of said plurality of optical fibers to provide said radiation and selecting at least one of said plurality of optical fibers to transmit said reflected radiation.

5. The method as described in claim 1, wherein said first intensity is measured at a plurality of locations of said object relative to said focal point, wherein said plurality of locations are substantially in a line, said line substantially perpendicular to said focal plane.

6. The method as described in claim 1, wherein said method is used to find said position of a plurality of points on said object to provide a topographical map of a surface of said object.

7. The method as described in claim 6 further comprising the steps of:
    passing said surface through said radiation at a constant distance relative to said focal point;
    measuring a second intensity of reflected radiation of said radiation from said surface in said detector, to produce an image of said surface.

8. The method as described in claim 1 wherein said object is a probe tip, and wherein said reference position is known relative to a region of a substrate to be tested.

9. A method of determining a position of a point on an object Comprising the steps of:
    providing radiation;
    focusing said radiation to a focal point, said focal point being in a focal plane:
    focusing reflected radiation from said object to a first site;
    measuring a first intensity of said reflected radiation incident upon said first site;
    determining said position of said point on said object relative to a reference position based upon said first intensity,
    wherein said object is a probe tip, and wherein said reference position is known relative to a region of a substrate to be tested.

10. A method of determining a position of a point on an object Comprising the steps of:
    providing radiation from a first site;
    focusing said radiation to a focal point, said focal point being in a focal plane;
    focusing reflected radiation from said object to a second site proximate said first site;
    measuring a first intensity of said reflected radiation focused to said second site;
    determining said position of said point on said object relative to a reference position based upon said first intensity,
    wherein said position is determined in three dimensions.

11. A method of determining a position of a point on an object comprising the steps of:
    providing radiation from a first site;
    focusing said radiation to a focal point, said focal point being in a focal plane;
    focusing reflected radiation from said object to a second site proximate said first site;
    measuring a first intensity of said reflected radiation focused to said second site;
    determining said position of said point on said object relative to a reference position based upon said first intensity,
    wherein said object is a probe tip, and wherein said reference position is known relative to a region of a substrate to be tested.

12. A method of determining a position of a point on an object comprising the steps of:
    providing radiation from a first site;
    focusing said radiation to a focal point, said focal point being in a focal plane;
    focusing reflected radiation from said object to a second site proximate said first site;
    measuring a first intensity of said reflected radiation focused to said second site;
    determining said position of said point on said object relative to a reference position based upon said first intensity,
    wherein said reference position is known relative to a null position which returns a null point in said first intensity, and wherein said position of said point on said object is determined by detecting said null point in said first intensity.

13. A method of determining a position of a point on an object comprising the steps of:
providing radiation from a first site;
focusing said radiation to a focal point, said focal point being in a focal plane;
focusing reflected radiation from said object to a second site proximate said first site;
measuring a first intensity of said reflected radiation focused to said second site;
determining said position of said point on said object relative to a reference position based upon said first intensity;
focusing said reflected radiation to said first site;
measuring a second intensity of said reflected radiation focused to said first site; and,
determining said position of said point on said object relative to said reference position based upon said second intensity.

14. A method of determining a position of a point on an object comprising the steps of;
providing radiation from a first site, wherein said radiation is provided from a source through a first optical fiber, said source illuminating a first end of said first optical fiber, said radiation exiting a second end of said first optical fiber, said second end of said first optical fiber being disposed at said first site;
focusing said radiation to a focal point, said focal point being in a focal plane;
focusing reflected radiation from said object to a second site proximate said first site, said second site disposed such that the optical paths of said radiation and said reflected radiation are not confocal, wherein said reflected radiation is focused onto a second end of a second optical fiber at said second site, said reflected radiation focused onto said second end of said second optical fiber being transmitted through said second optical fiber to a detector;
measuring a first intensity of said reflected radiation focused to said second site; determining said position of said point on said object relative to a reference position based upon said first intensity;
focusing said reflected radiation to said second end of said first optical fiber at said first site;
measuring a second intensity of said reflected radiation focused to said first site; and,
determining said position of said point on said object relative to said reference position based upon said second intensity.

15. The method as described in claim 14 comprising providing a plurality of said first optical fibers and a plurality of said second optical fibers, said method further comprising the steps of selecting at least one of said first optical fibers to provide said radiation and selecting at least one of said second optical fibers to measure said first intensity of said reflected radiation.

16. An apparatus for determining a position of a point on an object comprising:
a radiation source;
a optical fiber having a first and a second end, said first end disposed to receive radiation from said radiation source;
means for focusing radiation exiting said second end of said optical fiber disposed proximate said second end of said optical fiber, said means for focusing disposed to focus reflected radiation from said object to said second end; and,
means for detecting said reflected radiation exiting said second end of said optical fiber, wherein said apparatus is coupled to a semiconductor wafer prober, and wherein said apparatus is positioned to determine the position of an object selected from the group consisting of a probe tip and a point on a surface of said semiconductor wafer.

17. The apparatus as described in claim 16 further comprising:
a plurality of said optical fibers; and,
means for selecting at least one of said optical fibers to provide said radiation and means for selecting at least one of said optical fibers to provide said reflected radiation to said means for detecting.

18. An apparatus for determining a position of a point on an object comprising:
a radiation source providing radiation from a first site;
means for focusing said radiation disposed proximate said first site, said means for focusing disposed to focus reflected radiation from said object to a second site proximate said first site; and,
means for detecting said reflected radiation focused to said second site,
wherein said apparatus is coupled to a semiconductor wafer prober, and wherein said apparatus is positioned to determine a position of an object selected from the group consisting of a point on a surface of said semiconductor wafer and a probe tip.

19. An apparatus for determining a position of a point on an object comprising:
a radiation source providing radiation from a first site;
means for focusing said radiation disposed proximate said first site, said means for focusing disposed to focus reflected radiation from said object to a second site proximate said first site and,
means for detecting said reflected radiation focused to said second site,
wherein said apparatus further comprises means for encoding said radiation from each of said first optical fibers and wherein said apparatus further comprises means for decoding said reflected radiation to determine which of said first optical fibers provided said radiation.

20. An apparatus for determining a position of a point on an object comprising:
a radiation source providing radiation from a first site;
means for focusing said radiation disposed proximate said first site, said means for focusing disposed to focus reflected radiation from said object to a second site proximate said first site; and,
means for detecting said reflected radiation focused to said second site,
wherein said means for focusing further focuses said reflected radiation to said first site, said apparatus further comprising means for detecting said reflected radiation focused to said first site.

21. A method of determining a position of a point on an object comprising the steps of:
providing radiation from a first site; focusing said radiation to a focal point, said focal point being in a focal plane;
focusing reflected radiation from said object to a second site proximate said first site, said second site disposed such that the optical paths of said radiation and said reflected radiation are not confocal;

measuring a first intensity of said reflected radiation focused to said second site;

determining said position of said point on said object relative to a reference position based upon said first intensity, wherein said position is determined in three dimensions.

22. A method of determining a position of a point on an object comprising the steps of:

providing radiation from a first site;

focusing said radiation to a focal point, said focal point being in a focal plane;

focusing reflected radiation from said object to a second site proximate said first site, said second site disposed such that the optical paths of said radiation and said reflected radiation are not confocal;

measuring a first intensity of said reflected radiation focused to said second site;

determining said position of said point on said object relative to a reference position based upon said first intensity wherein said object is a probe tip, and wherein said reference position is known relative to a region of a substrate to be tested.

23. An apparatus for determining a position of a point on an object comprising:

a plurality of radiation sources providing radiation via a plurality of first optical fibers from a plurality of first sites;

means for encoding said radiation from each of said first optical fibers;

means for focusing said radiation disposed proximate said first sites, said means for focusing disposed to focus reflected radiation from said object to a plurality of second sites proximate said first sites, said second sites disposed such that the optical paths of said radiation and said reflected radiation are not confocal;

means for detecting said reflected radiation focused to said second sites, said second sites coupled to said means for detecting via a plurality of second optical fibers;

means for decoding said reflected radiation to determine which of said first optical fibers provided said radiation.

24. An apparatus for determining a position of a point on an object comprising:

a radiation source providing radiation from a first site;

means for focusing said radiation disposed proximate said first site, said means for focusing disposed to focus reflected radiation from said object to said first sight and to a second site proximate said first site, said second site disposed such that the optical paths of said radiation and said reflected radiation focused to said second site are not confocal;

means for detecting said reflected radiation focused to said first site; and means for detecting said reflected radiation focused to said second site.

* * * * *